(12) United States Patent
Vilain

(10) Patent No.: US 7,423,270 B2
(45) Date of Patent: Sep. 9, 2008

(54) ELECTRONIC DETECTION DEVICE AND DETECTOR COMPRISING SUCH A DEVICE

(75) Inventor: Michel Vilain, Saint Georges de Commiers (FR)

(73) Assignee: ULIS, Veurey Voroize (FR)

( * ) Notice: Subject to any disclaimer, the term of this patent is extended or adjusted under 35 U.S.C. 154(b) by 0 days.

(21) Appl. No.: 11/842,435

(22) Filed: Aug. 21, 2007

(65) Prior Publication Data

US 2008/0067389 A1 Mar. 20, 2008

(30) Foreign Application Priority Data

Sep. 18, 2006 (FR) .................................. 06 53798

(51) Int. Cl.
*G01J 5/00* (2006.01)
(52) U.S. Cl. ................................. 250/338.1
(58) Field of Classification Search ............. 250/338.1, 250/338.2, 338.3, 338.4, 338.5, 339.01, 339.02, 250/339.03, 339.04, 339.05, 339.06, 339.07, 250/339.08, 339.1, 339.11, 339.12, 339.13, 250/339.14, 339.15, 336.2
See application file for complete search history.

(56) References Cited

U.S. PATENT DOCUMENTS

| | | | |
|---|---|---|---|
| 5,399,897 | A | 3/1995 | Cunningham et al. |
| 5,930,594 | A | 7/1999 | Vilain |
| 5,949,119 | A | 9/1999 | Vilain |
| 6,198,098 | B1 | 3/2001 | Laou |

FOREIGN PATENT DOCUMENTS

EP  0 753 671 A1  1/1997

OTHER PUBLICATIONS

Wu et al., *"Integration of the DRIE, MUMPs, and Bulk Micromachining for Superior Micro-Optical Systems,"* IEEE, 2004, pp. 97-100.

*Primary Examiner*—David P. Porta
*Assistant Examiner*—Kiho Kim
(74) *Attorney, Agent, or Firm*—Burr & Brown

(57) ABSTRACT

This electronic detection device comprises a substrate and at least one microstructure, said microstructure comprising a membrane which extends substantially facing and at a distance from said substrate, said membrane being mechanically attached and electrically connected to at least one longilineal retention element which is mechanically and electrically connected to said substrate via at least one post. The device also comprises at least one stiffener element extending over at least one of the main faces of said microstructure.

10 Claims, 3 Drawing Sheets

ELECTRONIC DETECTION DEVICE AND DETECTOR COMPRISING SUCH A DEVICE

FIELD OF THE INVENTION

The present invention relates to an electronic detection device comprising one or more microstructures which generally fulfill an electronic function with arms and a membrane suspended above a substrate. Such an electronic device may, for example, constitute the bolometric sensor of an infrared radiation detector.

DESCRIPTION OF THE PRIOR ART

In the field of microelectronic structures comprising one or more electronic microstructures with arms and a membrane suspended above a substrate, attempts are made to miniaturise these microstructures as much as possible. It is therefore desirable to minimise the thickness of the arm which holds the membrane suspended above the substrate and the thickness of the membrane which forms an active part of the microstructure. In addition, it may be desirable to minimise the width of the retaining arms. Besides the reduction in the overall dimensions of electronic devices which this allows, such miniaturisation is also capable of improving the performance of microstructures.

Thus, in the field of microbolometer array detectors used to observe scenes illuminated by infrared rays, the membrane of each sensor which constitutes the detector is allowed to float, i.e. it is suspended above the substrate so that it is isolated, especially thermally isolated, and is electrically connected to the substrate via one or more longilineal retention elements commonly referred to as "arms".

The function of these retention elements is firstly to hold the membrane away from the substrate and prevent it touching the substrate and secondly to electrically connect the membrane to the substrate in order to collect the charge carriers released during interactions between photons and the membrane. As is known in this field, the temperature of every membrane rises due to the effect of incident radiation depending on the flux emitted by the observed scene. This temperature rise causes a variation in the electrical resistivity of every elementary sensor which is then analysed in order to produce an image of the observed scene.

The sensitivity of an elementary sensor is an essential quantity which affects the overall performance of a bolometric detector. This sensitivity is proportional to the thermal resistance between the sensitive membrane which warms up and the common substrate which remains globally isothermal both spatially and temporally, i.e. at every location and at all times.

This is why it is essential to master dimensioning of the arm and of the sensitive membrane of every elementary sensor of the detector. Thus, the narrowness of the arm, its fineness and that of the sensitive membrane determine this thermal resistance in every elementary sensor and, hence, the overall performance of the detector.

Moreover, the speed with which a microbolometric sensor responds to variation in the infrared flux originating from the observed scene with time depends on the total mass of material that forms the sensitive membrane. This is why one must minimise the thickness of the functional layers of the floating membrane in order to minimise the thermal inertia of the sensitive membrane, thus maximising the response speed of an elementary sensor.

However, miniaturising the arms and membranes of a detector generally involves an increase in the mechanical and thermal strains to which these elements are subjected due to the reduced surface area of the cross-sections which are exposed to these strains. Such thermomechanical strains impose dimensional limits on electronic devices according to the prior art beyond which deformation of the elements, arms and membranes of the sensor, their fragility or their susceptibility results in geometrical defects (dispersion) in the layout of the elementary sensors. This structural deterioration may have a harmful impact on the sensitivity and/or rigidity of the detector.

In fact, the membranes must be uniformly positioned throughout the two-dimensional grid which forms the array detector, both in terms of height and parallelism relative to the substrate. This is why the arms or longilineal retention elements of the membrane are important components, the dimensions of which must be optimised. Similarly, the sensitive membrane must be dimensioned so as to prevent it being deformed during operation of the detector whilst nevertheless ensuring good detection performance and fast response times in particular. The mechanical strengths of the arms and of the membrane to withstand bending, twisting or shear strains are a function of the moments of inertia of the orthogonal cross-section of these elements relative to the axes of these strains. These mechanical strengths therefore diminish as the thickness of these elements reduces.

Electronic devices according to the prior art generally have microstructures with arms having a thickness of 0.1 µm to 2 µm, a width of 0.5 µm to 2 µm and a length of 10 µm to 50 µm. In the case of microbolometer sensors, such arms may be made of several layers, one of which at least is electrically conductive. The general shape of a microbolometer sensor arm can be elongated, straight, set-square ("L" shaped) or "S" shaped when viewed from above.

In order to increase the mechanical strength of the arm and/or floating membrane, Document EP-A-0 753 671 proposes reinforcing only the lateral flanks of these elements. This therefore involves fitting reinforcing edges on the lateral walls of the arms or the membrane.

Moreover, Document U.S. Pat. No. 5,399,897 suggests making the arm and the membrane more rigid by making them curve in a direction which is perpendicular to the plane defined by the substrate. Such a structure does make it possible to slightly increase the moment of inertia of the cross-section of the elements curved in this way.

The solutions described by these documents detailing the prior art allow a relative increase in the rigidity of the microstructures used, but this increase remains insufficient given the thermomechanical strains involved which are made worse due to the increasing miniaturisation of such electronic devices. The arms or membranes of the microstructures described by these documents remain relatively flexible and deformable, especially when they are stressed in a direction bounded by the plane of a cross-section which is transverse relative to the main dimension of the arms.

Consequently, when such strains are present, there may be relatively significant bending and/or twisting of the microstructure in question and hence risk of failure or even damage to the electronic device thus equipped.

The object of the present invention is therefore a high-performance electronic detection device having an arm and/or sensitive membrane which are not as deformable as devices according to the prior art.

BRIEF SUMMARY OF THE INVENTION

The object of the present invention is an electronic detection device, the arm or arms and/or membrane of which have increased resistance to mechanical and thermal strains to which they are subjected and offering performance which can also be improved.

The invention relates to an electronic detection device comprising a substrate and at least one microstructure, this microstructure comprising a membrane and at least one longilineal retention element, said membrane extending substantially facing and at a distance from the substrate. The membrane is mechanically attached and electrically connected to said longilineal retention element. The longilineal retention element is mechanically attached and electrically connected to the substrate via at least one post.

According to the invention, said microstructure also comprises at least one stiffener element having a hollow cross-section and extending over at least one of the main faces of this microstructure.

In other words, the arm and/or membrane of the microstructure is (are) made rigid by at least one element acting as a beam located on their face facing the substrate and/or on their face opposite to the face facing the substrate. Such a beam makes it possible to substantially increase the moments of inertia of the cross-sections of the arm and/or of the membrane along all the main axes of these cross-sections.

The hollow cross-section of the stiffener element makes it possible to rigidify the electronic microstructure whilst limiting the additional weight used and hence the thermal inertia of the elements, arms and/or membrane thus reinforced.

The term "facing and at a distance from" is taken to mean "contactless" or "floating". Also, the adjective "longilineal" in the expression "longilineal retention element" characterises the fact that the arm has a determined free, floating length between its point of connection to the membrane and its point of connection to the substrate. Consequently, the term "longilineal retention element" can denote an arm having a straight, curved or more complex shape such as an "S" shape.

In practice, the longilineal retention element may comprise a longilineal stiffener element which extends over its entire length.

This way, the arm is made rigid over its entire length. It is therefore possible to make it thinner and waisted whilst still preserving satisfactory rigidity.

According to the invention, the stiffener element extends in a direction which is transverse with respect to the main face in question of the microstructure.

In one particular embodiment of the invention, the membrane comprises at least one stiffener element extending in the direction of one of its main dimensions and over the entire length of this membrane.

Such a structure makes it possible to make the membrane more rigid in a preferred direction so as to resist a strain along a specific axis.

In practice, the stiffener element may have a trapezoidal shaped cross-section, the base of which is linked to this microstructure.

In one embodiment of the invention, the device may comprise a plurality of stiffener elements extending in the direction of one and/or both main dimensions of the membrane. Such a structure makes it possible to make the membrane more rigid in both the directions of the plane in which it is globally bounded.

In another particular embodiment of the above arrangement, the device may comprise several longilineal stiffener elements that are parallel to each other. Such a feature makes it possible to reinforce the microstructure over the entire main face in question, regardless whether it is the face that faces the substrate or the outer face.

The invention also relates to an array detector for electromagnetic radiation, such as infrared rays. According to the invention, the elementary sensors of this detector each consist of an electronic device as explained above and each of the membranes comprises a material which is sensitive to this radiation.

Such a detector is therefore more resistant to the mechanical and thermal strains to which it is subjected, especially during operating phases.

Moreover, the invention also relates to a method for producing an electronic detection device comprising a substrate and at least one microstructure, this microstructure comprising a membrane which extends substantially facing and at a distance from the substrate, the membrane being mechanically attached and electrically connected to at least one longilineal retention element, the latter being mechanically and electrically connected to the substrate via at least one post.

BRIEF DESCRIPTION OF THE DRAWINGS

The present invention and its resulting advantages will become more readily apparent from the following description, reference being made, merely by way of example, to the accompanying drawings which show examples of embodiments of the invention.

DESCRIPTION OF THE PREFERRED EMBODIMENTS

The various Figures are schematic views and consequently include elements that are not to scale.

Figure 1:
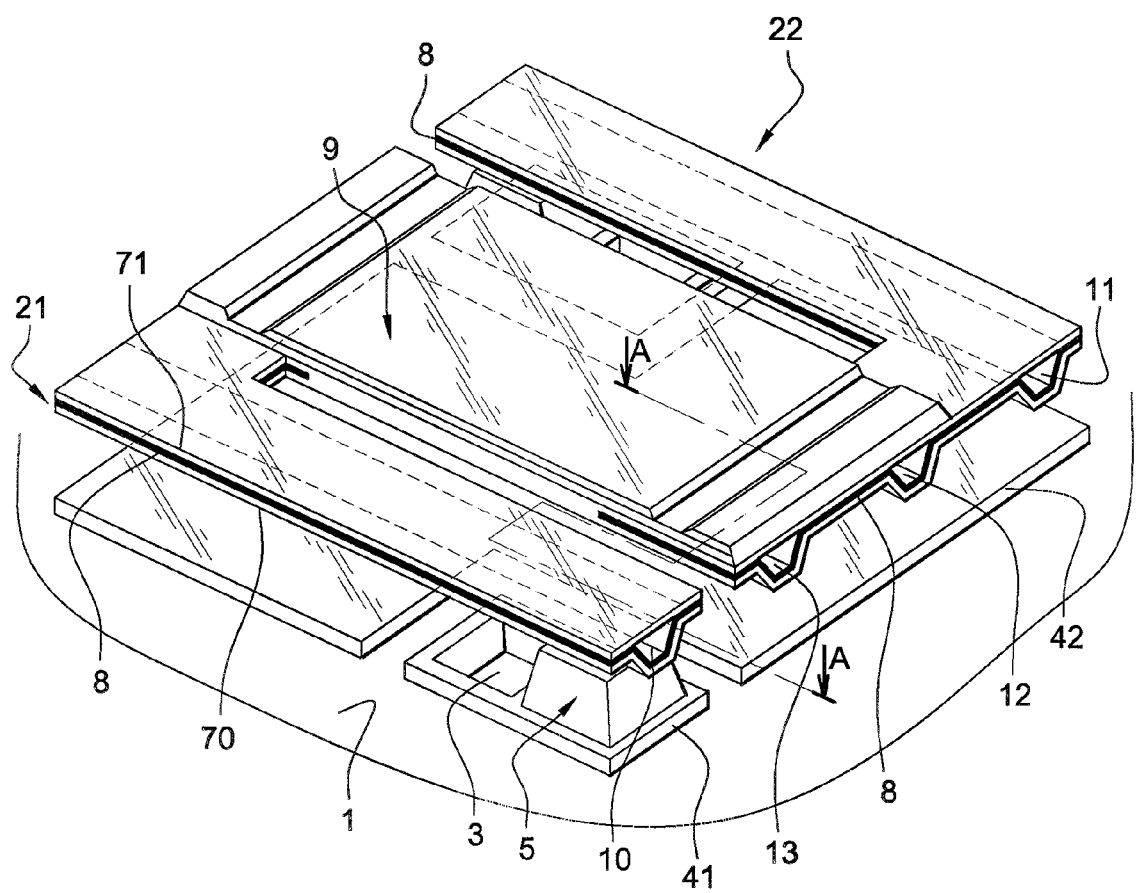
FIG. 1 is a schematic perspective view of an electronic device in accordance with the invention.

FIG. 1 shows an electronic device in accordance with the invention designed to detect infrared radiation using the known principle of microbolometer detectors. In FIG. 1, the elementary microbolometer sensor comprises substrate 1 which accommodates a circuit for reading the signals emitted by the active elements of the sensor. Substrate 1 is flat overall and is used as a base layer in order to produce the microstructure, in this case an elementary sensor, using monolithic thin-layer deposition, lithography or etching techniques. Thus, substrate 1 is common to all the elementary sensors which form the array detector.

The sensitive part of the elementary sensor in FIG. 1 consists of membrane 9 which is floatingly mounted above substrate 1. The material from which membrane 9 is made is sensitive to temperature, exhibits bolometric behaviour and has a specific thickness determined depending on the radiation to be detected. It can be, for example, doped amorphous silicon or any other appropriate sensitive material. Membrane 9 conventionally has a surface which is flat overall and rectangular or square shaped in order to collect incident radiation.

Membrane 9 is kept floating or suspended above the substrate by two longilineal retention elements 21 and 22. As stated above, such retention elements are commonly referred to as support arms in the field of bolometer detectors. When viewed from above, longilineal retention elements 21 and 22 each have a classic <<L>> or set-square shape. They are mechanically attached to membrane 9 at their shorter leg.

In addition, longilineal retention elements 21 and 22 comprise a layer of conductive material 8 which is in contact with membrane 9 at each shorter leg of arms 21 and 22 so as to collect the signals emitted by sensitive membrane 9.

Thus, the conductors formed by layer 8 are capable of acting as electrodes for bolometer membrane 9. In the example in FIG. 1, the conducting layer is embedded between two layers which fulfill mechanical functions. Nevertheless, it can also constitute an outer skin on arms 21 and 22.

Each of arms 21 and 22 is supported by a post 5 positioned towards the end of the corresponding arm 21 or 22 opposite the shorter leg connected to membrane 9. Posts 5 are thus interposed between substrate 1 and the overall flat area defined by arms 21 and 22 and by membrane 9. Besides mechanically supporting the assembly consisting of arms 21 and 22 and membrane 9, posts 5 ensure electrical connection between substrate 1 and each of the two electrodes formed by the layer of conducting materials 8.

According to the invention, each of aims 21 and 22 is associated with a longilineal stiffener element 10, 11 designed to increase the mechanical strength of the elementary sensor and, in particular, of the corresponding arm. In practice, the two longilineal stiffener elements 10 and 11 extend over the entire length of arms 21 and 22 with which they are associated respectively In the example in FIG. 1, the longilineal stiffener elements have a trapezoidal shaped cross-section, the upper side of which is open and the base of which is connected to the microstructure, arm or membrane.

Here, such longilineal stiffener elements therefore have a beam shape and make it possible to increase the moments of inertia of the cross-sections of arms 21 and 22 considerably, especially with respect to axes bounded by the plane of these cross-sections.

In addition, sensitive membrane 9 is also reinforced by two longilineal stiffener elements 12 and 13 which extend in the direction of one of its main dimensions, in this case over its entire length. Like beams 10 and 11, stiffener elements 12 and 13 extend over the main face of the electronic microstructure which is oriented towards substrate 1, i.e. the lower face. Moreover, stiffener elements 10-13 extend in a direction which is transverse to the main face that accommodates them.

The four stiffener elements are also hollow, i.e. they define a structure which is tubular overall. This characteristic makes it possible to limit the extra weight produced by stiffener elements 10-13 whilst ensuring that microstructures have increased moments of inertia along three axes.

Moreover, beams 10-13 need not extend over the entire length or width of arms 21-22 or membrane 9, on the contrary, they can be replaced by a plurality of discontinuous small stiffener elements. Such a structure makes it possible, in particular, to limit the mass of the stiffener elements whilst making sure that the microstructure has the required mechanical strength.

FIG. 1 therefore shows a single electronic device in accordance with the invention which constitutes an elementary sensor for a bolometer detector. It is then necessary to juxtapose a plurality of identical elementary sensor in an array in order to form a complete detector and this makes it possible to form a classic two-dimensional retina in which the support posts, arms and even the membranes themselves can be common to all or some of the elementary sensors.

Figure 2A:
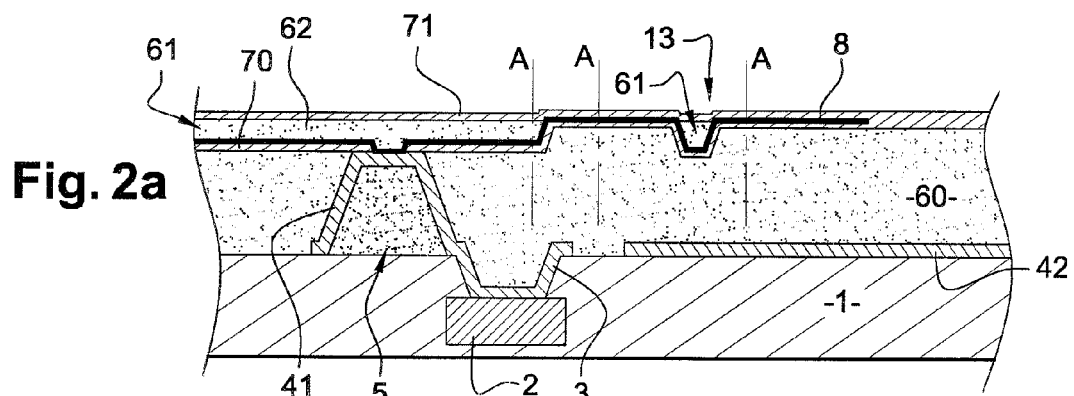
FIGS. 2a and 2b are schematic cross-sectional views along broken line A-A in FIG. 1.
Figure 2B:
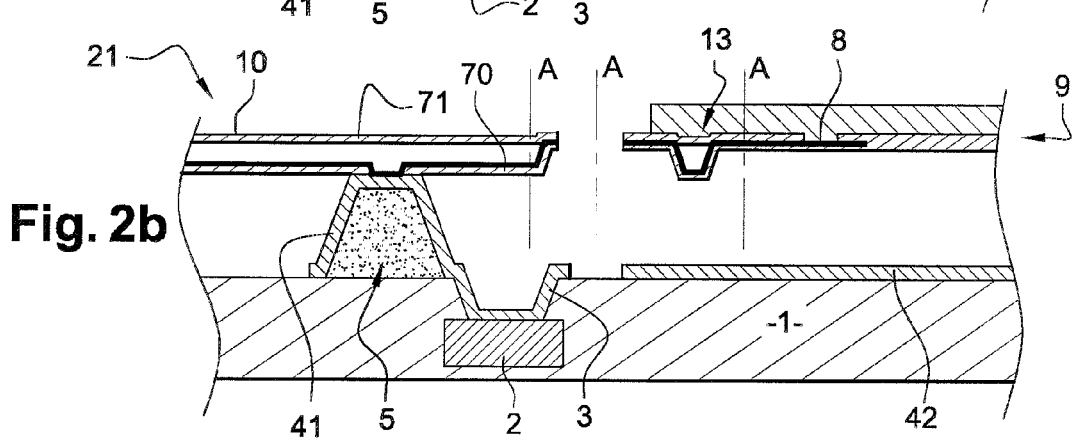

FIGS. 2a and 2b show an electronic device obtained by using a fabrication method in accordance with the invention. FIG. 2a shows a stage in this method whereas FIG. 2b shows the electronic device in its finished state like that in FIG. 1. To make the diagrams easier to read, changes in the orientation of broken line A-A are indicated by chain dotted lines in FIGS. 2a and 2b.

In order to obtain conduction of electrical signals into substrate 1, the latter comprises metal parts 2, the passivation layer of which has openings 3. These openings act as bonding pads to provide electrical contact in order to transfer the signals generated in the microstructure to the read circuit associated with substrate 1.

Using a technique which is well known to those skilled in the art called "spin-on glass", one then deposits a first layer of a planarising material, i.e. the upper surface of which is relatively smooth, of an organic type such as polyimide or of a mineral type such as, for example, silicon dioxide. One then removes the material which constitutes this first layer except in areas close to openings 3 so as to leave only posts 5. The height of posts 5 typically ranges from 1.5 µm to 2 µm in order to define a bolometer sensor that is sensitive to rays having a wavelength of 8 µm to 14 µm.

Removal of material from around posts 5 is obtained here by means of a lithographic process associated with etching. It can, however, be obtained using lithography only if the planarising material is photosensitive. It should also be noted that the shape of posts 5 which have a trapezoidal cross-section is specified here merely by way of example and that posts 5 can have different shapes without departing from the scope of the invention. Obviously, the stage to produce posts 5 is performed in order to reveal the bottom of openings 3 in the passivation layer so as to expose the non-passivated surface of metal parts 2.

During the next stage, a classic technique is used to deposit a second layer 4 made of electrically conducting materials onto the entire surface resulting from the previous stages. This second layer may typically consist of titanium and aluminum.

This layer is then processed by lithography and etching in order to, firstly, disassociate the areas of electrical continuity 41 between metal parts 2 and the outer surface of posts 5 and, secondly, in order to define a stratum that classically forms reflector 42 for the detected radiation. Such a reflector actually makes it possible to return infrared rays which partially cross this membrane back towards sensitive membrane 9. This makes it possible to maximise the radiant flux which interacts with membrane 9 and consequently maximise the signal-to-noise ratio of the detector.

The next stage involves depositing another layer of planarising material 60, for example polyimide, in order to bury the previously deposited layers, especially posts 5, with an excess thickness of the order of 0.1 µm to 0.5 µm. The average total thickness thus reached is then approximately 2 µm which substantially represents the height at which the floating parts are located above substrate 1 (arms and membrane).

According to one of the aspects of the invention, the next stage is then to make grooves 61 on the surface of layer 60 of planarising material. These grooves 61 can be produced by applying a lithographic mask associated with dry etching in order to monitor the dimensions and the shape of these grooves 61. The openings in the lithographic mask correspond to the locations where one wants to place stiffener elements. Thus, in order to place a stiffener element on arm 21 or 22 of the microstructure, a groove must be made in the appropriate location, i.e. as an extension of and above post 5 (left-hand part of FIGS. 2a and 2b). This is why it is desirable to leave planarising material 60 covering pillars 5. Conversely and as in the arrangement in FIG. 2a, groove 61 is intended to form a stiffener element for membrane 9.

Also, in order to perfectly control the shape of the cross-section of grooves 61, one can use an anisotropic process in the vertical direction and monitor the angle profile. This way, one can produce stiffener elements having a trapezoidal shaped cross-section similar to beams 10-13 shown in FIG. 1.

Subsequently, one deposits a layer of dielectric material 70 such as silicon dioxide or silicon nitride using a conventional chemical vapour deposition method (CVD). The thickness of dielectric layer 70 can be 10 nm to 50 nm. In addition, it is necessary to apply a lithographic mask and perform appropriate etching in order to eliminate material 70 from the top of posts 5. In fact, the electrical signals collected by arms 21 and 22 are conducted and transmitted to the read circuit of substrate 1 via the tops of posts 5.

The next stage of the method which is the object of the present invention involves using a classic technique to deposit a fine layer 8 of an electrically conducting material such as titanium nitride. As stated in relation to FIG. 1, layer 8 makes it possible to ensure electrical conduction in arms 21 and 22 and in part of sensitive membrane 9. Layer 8 thus forms two electrodes for bolometer membrane 9. As before, a lithographic mask must be applied and appropriate etching performed after depositing layer 8 so as to define the contour of conductive area 8 which overall forms an "L" viewed from above, as shown in FIG. 1.

One then deposits a new layer of planarising material 62 over the entire surface of the microstructure and then thins it, for example by dry etching, to reveal or expose all the surfaces located outside of grooves 61 which define the stiffener elements that are distinctive of the invention. The material from which layer 62 is made can be identical to the material that constitutes layer 60. One then deposits a second layer of dielectric material 71 using a technique similar to that used in order to form layer 70.

The subsequent stages are shown in FIG. 2b which schematically shows the electronic detection device in its finished operational state as in FIG. 1. To achieve this final state, one first applies a lithographic mask so as to open the electrical contact surfaces through layer 71, then one etches this layer in a known manner in order to locally expose electrically conducting layer 8. In the example in FIGS. 1 and 2, etching is performed on the sides of membrane 9 located as an extension of each shorter leg.

The next stage involves depositing a bolometric material over the entire surface area of membrane 9. This material can, for instance, consist of doped amorphous silicon deposited to a thickness capable of fulfilling the thermometric function assigned to sensitive membrane 9.

The thickness of this bolometer layer depends on the radiation that one wants to detect and can vary from 20 nm to 5000 nm. The bolometric material makes it possible to provide electrical resistance which extends between the elongated lateral areas allowing electrical contact with electrically conducting layer 8.

The next stage involves eliminating part of the bolometric material so as to expose dielectric layer 71 at the level of arms 21 and 22. In fact, arms 21 and 22 must, in a known manner, have a high thermal resistance and consequently preferably be free of any bolometric material.

Finally, a lithographic mask is applied to the resulting structure obtained after all the stages described above so as to delineate the final outlines of membrane 9 and the arms or longilineal retention elements 21 and 22.

The very last stage of the method for fabricating an electronic device in accordance with the invention involves eliminating layer 60, for example by means of oxygen plasma or an equivalent method if layer 60 is an organic type layer. Once layer 60 has been eliminated, sensitive membrane 9 and most of arms 21 and 22 are then floating, i.e. suspended above substrate 1 and, more precisely, electrically conducting layer 4 without there being any contact. The stage to eliminate layer 60 also makes it possible to eliminate the sacrificial material which fills grooves 61 so that stiffener elements 10-13 are then emptied and finally have a hollow cross-section.

Figure 3A:
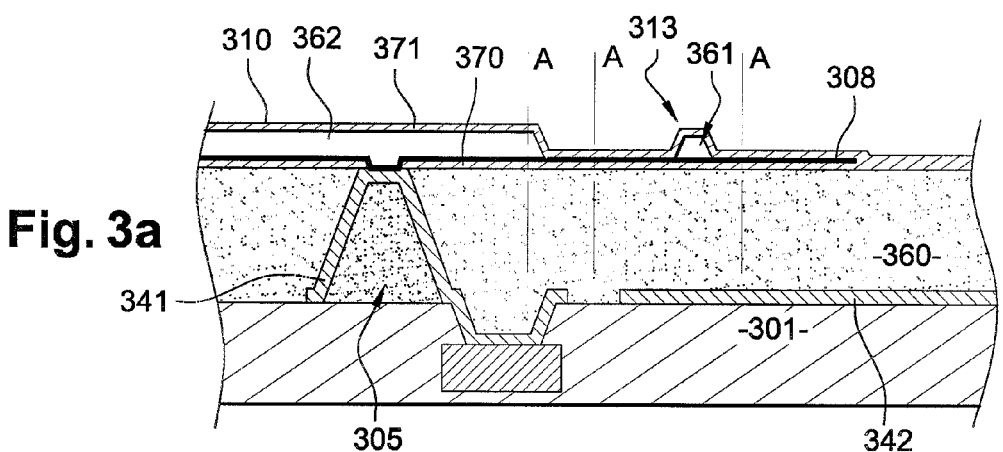
FIGS. 3a and 3b are schematic cross-sectional views similar to FIGS. 2a and 2b of another embodiment of the invention.
Figure 3B:
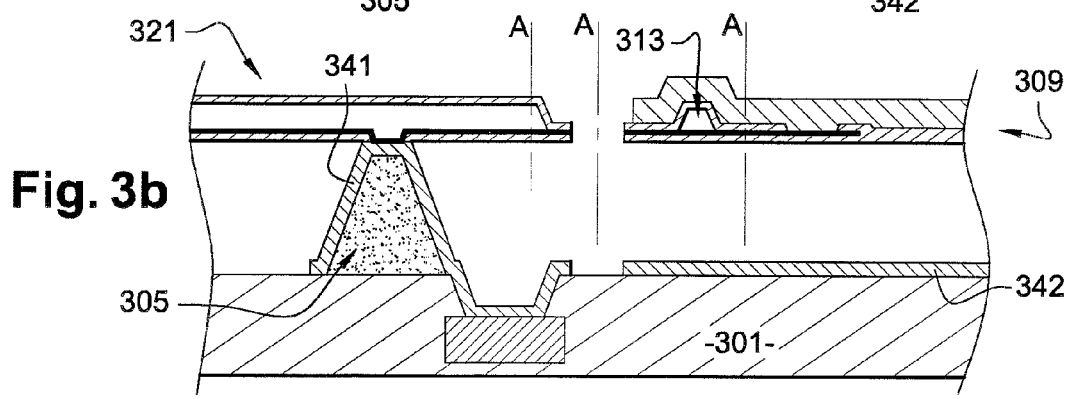

FIGS. 3a and 3b show a second embodiment of the electronic device and the method for fabricating it in accordance with the invention. FIG. 3a shows an intermediate state and FIG. 3b shows the final state. In this embodiment of the invention, the stiffener elements are no longer made hollow in layer 360 but, in contrast, form protrusions above electrically conducting layer 308. Consequently, the stiffener elements are made on the main upper face of the arms and the membrane, i.e. on their free face opposite their main face which faces towards the substrate (lower face).

Producing such stiffener elements 310, 313 therefore involves performing the same stages as in the method described above without applying a special lithographic mask to layer 360 before depositing dielectric layer 370. Conversely, a lithographic mask must be applied before etching layer 361, 362 made of a planarising material before depositing dielectric layer 371.

In order to control the dimensions and the shape of the cross-section of stiffener elements 310, 313, it is possible to perform an isotropic erosion stage on the photosensitive resin which forms the lithographic mask used to form the protrusions which define stiffener elements 310, 313. The thickness of layer 361, 362 is determined depending on the desired height for stiffener elements 310, 313.

After producing protrusions 310, 313, dielectric layer 371 is deposited in the same way as layer 71 shown in FIGS. 2a and 2b. Finally, a layer of bolometric material is deposited before etching the arms and membrane, then eliminating intermediary sacrificial layer 360. Resulting membrane 309 produced by this alternative method level has protrusions forming the stiffener elements.

Given the differences between these two fabrication methods, it may be desirable to make posts 305 slightly taller than posts 5 in order to preserve an appropriate distance defining the gap between the substrate and the sensitive membrane.

Figure 4A:
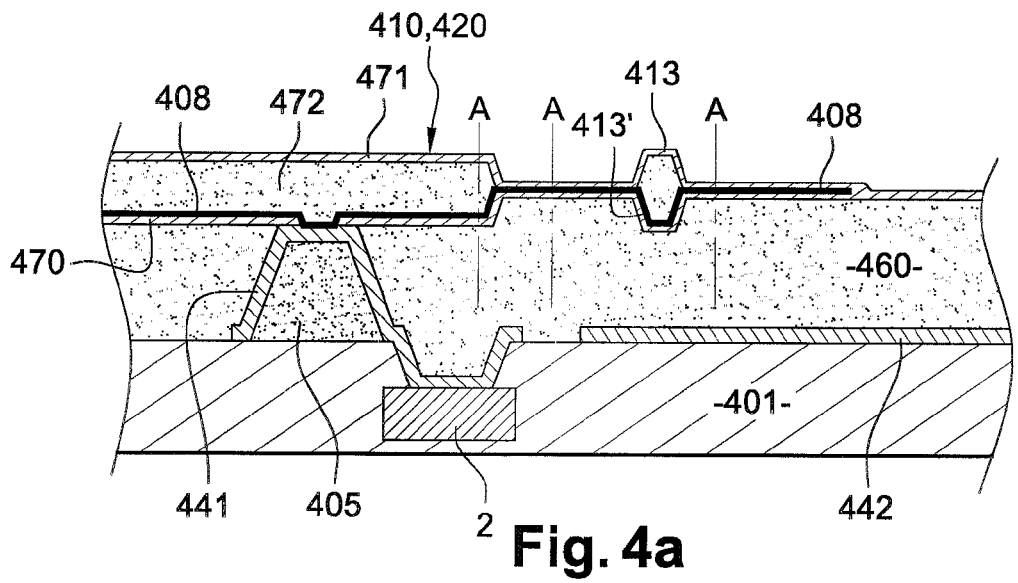
FIGS. 4a and 4b show are schematic cross-sectional views similar to FIGS. 2a and 2b of another embodiment of the invention.
Figure 4B:
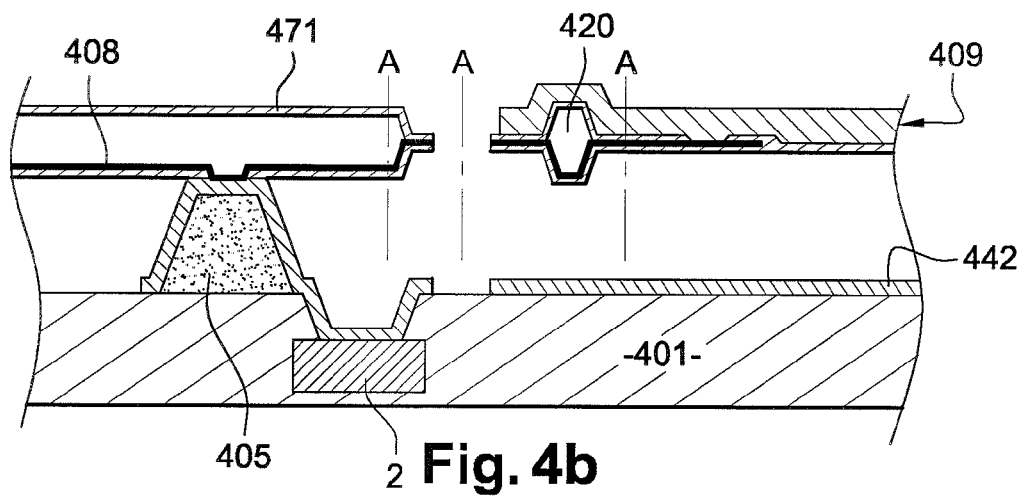

According to another embodiment of the invention, detailed in FIGS. 4a and 4b, stiffener elements both hollow in layer and protruding, said hollows and protrusions being respectively aligned one with the other (see FIG. 4b which illustrates the final state). Thus, said stiffener elements are defining tubes 420, which extends both over and under the plane of the membrane 409, said membrane extending itself somewhat in the equator plane of said tubes.

Each of said tubes is defined by a stiffener element hollow in layer 413 and by a stiffener element protruding 413', said stiffener element hollow in layer receiving the layer made of an electrically conducting material 408, forming electrodes of said bolometric membrane 409.

Essential elements constituting the detector of this embodiment of the invention have been illustrated in FIGS. 4a and 4b, reference numerals being identical to those of FIGS. 2a and 2b plus 400. Additionally, the method to realise this embodiment is identical or similar to those above disclosed.

An electronic device in accordance with the present invention has elements which define floating structures having cross-sections with moments of inertia which are increased compared with devices according to the prior art. Such an electronic device therefore has greater resistance to mechanical and thermal strains, especially bending, buckling, creep strains etc. When producing bolometric sensors, it is therefore possible to increase the mechanical strength of an arm or a membrane compared with previous bolometric sensors by a factor of 2 using simple arm and membrane shapes.

Consequently, it is alternatively possible to reduce the thicknesses of the arms and/or the membrane as well as their width without thereby adversely affecting the mechanical strength of these elements Such a reduction in the dimension of these elements has the advantage of increasing their thermal resistance and this results in improved sensitivity of the elementary sensor if it is a bolometric detector. In fact, the thermal resistance of the arms per unit of length depends on the quantity of material in their cross-section and is defined by the equation $R_{th}=\rho L/s$, where:

$R_{th}$ is the thermal resistance of the arm per unit of length;

$\rho$ is the equivalent thermal resistivity of the materials which form the cross-section;

L is the resisting length in question;

and s is the surface area of the cross-section.

Thus, the smaller the cross-section s, the higher the thermal resistance $R_{th}$ and the greater the sensitivity of the detector.

As has been demonstrated, increasing the rigidity of the membrane makes it possible to reduce its thickness, thus reducing its mass and its thermal inertia. The dynamic performance of an elementary sensor thus produced is enhanced compared with that of an elementary sensor according to the prior art.

This way, one can produce a bolometric sensor having arms, like sensors according to the prior art, having a width of 1 μm to 1.5 μm but where the thicknesses of dielectric layers 70 and 71 are reduced to 15 nm or even 10 nm, whereas the thickness of each of the dielectric layers according to the prior art is at least 30 nm. Such reduced thickness makes it possible to increase the thermal resistance of the arm and hence the bolometric sensitivity of the sensor by 50 to 100% while substantially retaining the same transverse rigidity, i.e. the same elastic resistance to deformation of the arm. Also, increasing the developed surface of the main face of the membrane which accommodates the stiffener elements has no significant effect on the sensitivity of the elementary sensor.

The embodiments described above relate to the field of bolometric detectors but the general principle of the invention, involving the addition of stiffener elements to a microstructure, can nevertheless be applied to other so-called "floating" microstructures or electronic devices without departing from the scope of the invention.

Examples of such devices include acoustic resonators, sound level meters, rate gyros, accelerometers and other related devices for which elastic, electronic, thermoelastic or optoelastic characteristics are crucial.

The invention claimed is:

1. An electronic detection device comprising a substrate and at least one microstructure, said microstructure comprising a membrane and at least one longilineal retention element, said membrane extending substantially facing and at a distance from said substrate and being mechanically attached and electrically connected to said longilineal retention element which is mechanically and electrically connected to the substrate via at least one post, wherein the microstructure also comprises at least one stiffener element having a hollow cross-section and extending over at least one of the main faces of said microstructure.

2. An electronic detection device as claimed in claim 1, wherein the stiffener element extends in a direction which is transverse with respect to the main face of the microstructure.

3. An electronic detection device as claimed in claim 1, wherein the longilineal retention element comprises a longilineal stiffener element extending over its entire length.

4. An electronic detection device as claimed in claim 1, wherein the membrane comprises at least one stiffener element extending in the direction of one of the main dimensions and over the entire length of said membrane.

5. An electronic detection device as claimed in claim 1, wherein the stiffener element has a trapezoidal shaped cross-section, the base of which is linked to said microstructure.

6. An electronic detection device as claimed in claim 1, wherein the stiffener element is in the form of a tube constituted of stiffener elements extending on both main faces of the microstructure.

7. An electronic detection device as claimed in claim 6, wherein the membrane is in a plane, which substantially extends along the equatorial plane of said tubes.

8. An electronic detection device as claimed in claim 1, wherein it comprises a plurality of stiffener elements extending in the direction of one and/or the other main dimensions(s) of said membrane.

9. An electronic detection device as claimed in claim 1, wherein it comprises several longilineal stiffener elements which are parallel to each other.

10. An array detector for electromagnetic radiation such as infrared radiation comprising a plurality of elementary sensors for the radiation in question, wherein said elementary sensors each consist of an electronic device as claimed in any of the preceding claims, each of said membranes comprising a material which is sensitive to this radiation.

* * * * *